(12) United States Patent
Shi

(10) Patent No.: US 12,666,133 B2
(45) Date of Patent: Jun. 23, 2026

(54) PHOTOGRAPHING METHOD AND APPARATUS

(71) Applicant: VIVO MOBILE COMMUNICATION CO., LTD., Guangdong (CN)

(72) Inventor: Yuchen Shi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 70 days.

(21) Appl. No.: 18/660,615

(22) Filed: May 10, 2024

(65) Prior Publication Data

US 2024/0292087 A1      Aug. 29, 2024

Related U.S. Application Data

(63) Continuation of application No. PCT/CN2022/131267, filed on Nov. 11, 2022.

(30) Foreign Application Priority Data

Nov. 12, 2021    (CN) .......................... 202111346431.X

(51) Int. Cl.
  *H04N 23/63*       (2023.01)
  *H04N 23/611*      (2023.01)
(52) U.S. Cl.
  CPC ......... *H04N 23/632* (2023.01); *H04N 23/611* (2023.01)
(58) Field of Classification Search
  CPC .. H04N 23/632; H04N 23/611; H04N 23/635; G06F 3/013; G06V 40/18; G06V 40/193
  See application file for complete search history.

(56) References Cited

U.S. PATENT DOCUMENTS

| | | | |
|---|---|---|---|
| 4,950,069 A | 8/1990 | Hutchinson | |
| 2015/0091794 A1* | 4/2015 | Ha .................... | H04M 1/72403 |
| | | | 345/156 |
| 2016/0323503 A1 | 11/2016 | Wada | |
| 2017/0094159 A1 | 3/2017 | Priesum | |
| 2020/0221021 A1 | 7/2020 | Arai | |
| 2021/0056719 A1 | 2/2021 | Li et al. | |
| 2021/0166001 A1* | 6/2021 | Cho .................... | H04M 1/0268 |

FOREIGN PATENT DOCUMENTS

| | | |
|---|---|---|
| CN | 103176607 A | 6/2013 |
| CN | 105430269 A | 3/2016 |
| CN | 105847540 A | 8/2016 |
| CN | 105940668 A | 9/2016 |

(Continued)

*Primary Examiner* — Yogesh K Aggarwal
(74) *Attorney, Agent, or Firm* — Price Heneveld LLP

(57) ABSTRACT

This application discloses a photographing method and apparatus. The photographing method includes: obtaining an eyeball gaze position of a user when a front-facing camera is activated to shoot an image; and performing a preset processing operation when the gaze position is not concentrated in a fixed region within a first preset duration; where the preset processing operation includes displaying a facial image of a first user in a preview image at the gaze position or displaying the facial image of the first user in the preview image at a target position on the screen; where the target position is within a first preset region range of the front-facing camera.

15 Claims, 5 Drawing Sheets

(56) References Cited

FOREIGN PATENT DOCUMENTS

| | | | |
|---|---|---|---|
| CN | 107024990 | A | 8/2017 |
| CN | 107277375 | A | 10/2017 |
| CN | 110460831 | A | 11/2019 |
| CN | 111698564 | A | 9/2020 |
| CN | 113891002 | A | 1/2022 |
| JP | 2014127830 | A | 7/2014 |
| WO | 2014192001 | A2 | 12/2014 |

* cited by examiner

PHOTOGRAPHING METHOD AND APPARATUS

CROSS-REFERENCE TO RELATED APPLICATIONS

This application is a Bypass continuation application of PCT International Application No. PCT/CN2022/131267 filed on Nov. 11, 2022, which claims priority to Chinese Patent Application 202111346431.X, filed with the China National Intellectual Property Administration on Nov. 12, 2021 and entitled "PHOTOGRAPHING METHOD AND APPARATUS", which are incorporated herein by reference in their entireties.

TECHNICAL FIELD

This application pertains to the technical field of electronic devices and specifically relates to a photographing method and apparatus.

BACKGROUND

With the continuous development of photographing technology, the photographing functions of terminal devices are becoming increasingly sophisticated, leading more users to choose terminal devices for photographing. Especially the front-facing cameras of terminal devices allow users to take photos of themselves without the need for assistance from others, satisfying photographing needs of users and facilitating the operation of taking photos.

When using a front-facing camera to take photos, such as in selfie mode, users sometimes wish to capture images with different eye expressions. Therefore, users may continuously adjust the direction they are looking at. At this time, although the eyes may see the preview screen, they may not see themselves within the preview screen, preventing users from observing their facial state through the preview screen to confirm the photographing effect. Alternatively, to check their facial state, users may shift their gaze back and forth between the preview screen and the camera, which may change the facial state, leading to the need for readjusting the facial state.

In summary, in the prior art, the gaze direction of a user during photographing may affect the photographing.

SUMMARY

The purpose of embodiments of this application is to provide a photographing method and apparatus.

In a first aspect, an embodiment of this application provides a photographing method, where the method includes:

obtaining an eyeball gaze position of a user when a front-facing camera is activated to shoot an image; and performing a preset processing operation when the gaze position is not concentrated in a fixed region within a first preset duration; where the preset processing operation includes displaying a facial image of a first user in a preview image at the gaze position or displaying the facial image of the first user in the preview image at a target position on the screen; where the target position is within a first preset region range of the front-facing camera.

In a second aspect, an embodiment of this application provides a photographing apparatus, where the apparatus includes:

a first obtaining module, configured to obtain an eyeball gaze position of a user when a front-facing camera is activated to shoot an image; and a processing module, configured to perform a preset processing operation when the gaze position is not concentrated in a fixed region within a first preset duration; where the preset processing operation includes displaying a facial image of a first user in a preview image at the gaze position or displaying the facial image of the first user in the preview image at a target position on the screen; where the target position is within a first preset region range of the front-facing camera.

In a third aspect, an embodiment of this application provides an electronic device, where the electronic device includes a processor, a memory, and a program or an instruction stored on the memory and capable of running on the processor. When the program or instruction is executed by the processor, the steps of the photographing method according to the first aspect are performed.

In a fourth aspect, an embodiment of this application provides a non-transitory readable storage medium, where the non-transitory readable storage medium stores a program or an instruction, and when the program or instruction is executed by a processor, the steps of the photographing method according to the first aspect are performed.

In a fifth aspect, an embodiment of this application provides a chip, where the chip includes a processor and a communications interface, the communications interface is coupled to the processor, and the processor is configured to run a program or an instruction to perform the steps of the photographing method according to the first aspect.

In a sixth aspect, an embodiment of this application provides a computer program product, where the program product is stored on a non-volatile storage medium, and the program product is executed by at least one processor to perform the steps of the method according to the first aspect.

In a seventh aspect, an embodiment of this application provides an electronic device, where the electronic device is configured to execute the method according to the first aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances such that the embodiments of this application can be implemented in an order other than those illustrated or described herein. In addition, "first" and "second" are typically used to distinguish between objects of a same type but do not limit quantities of the objects. For example, there may be one or more first objects. In addition, in this specification and claims, "and/or" indicates at least one of the connected objects, and the character "/" generally indicates an "or" relationship between the contextually associated objects.

The following is a detailed explanation of the photographing method according to an embodiment of this application, in conjunction with the accompanying drawings, through specific embodiments and their application scenarios.

Figure 1:
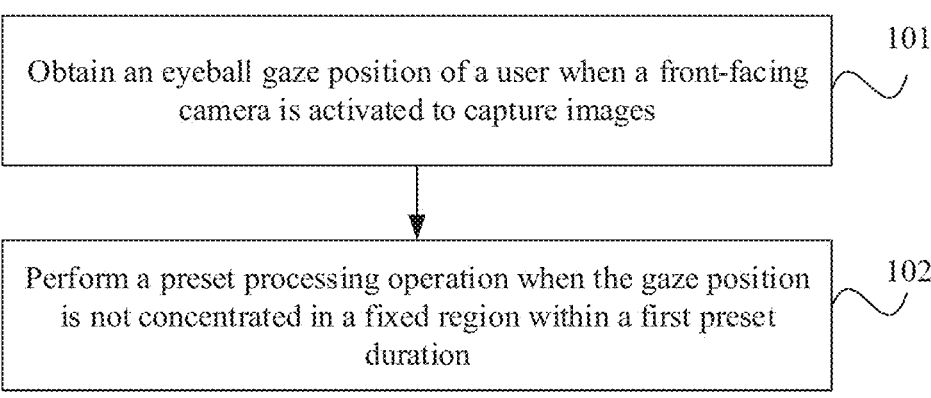
FIG. 1 is a schematic flowchart illustrating the photographing method according to an embodiment of this application.

FIG. 1 is a schematic flowchart illustrating a photographing method according to an embodiment of this application, which is applicable to electronic devices with front-facing cameras such as mobile phones, tablet computers, cameras, and the like.

The photographing method may include the following steps.

Step 101: Obtain an eyeball gaze position of a user when a front-facing camera is activated to capture images.

When a person's eyes look in different directions, subtle changes occur in the eyes, which produce extractable features. Based on these features, eye tracking can be achieved, thus determining the eyeball gaze position (that is, a visual focus position). For the extraction of eye features, the front-facing infrared sensor of the electronic device (that is, the infrared sensor disposed on the same side of the electronic device as the front-facing camera) can be used to capture the state of the eyes, and then feature extraction can be performed based on the captured eye state. Certainly, apart from using the front-facing infrared sensor, the facial image captured by the front-facing camera can also be used, and then feature extraction can be performed based on the eye image in the facial image.

The front-facing camera is generally the camera used to capture images in selfie mode. Typically, in selfie mode, the user, camera, and screen are on the same side of the electronic device.

Step 102: Perform a preset processing operation when the gaze position is not concentrated in a fixed region within a first preset duration.

The preset processing operation may include: displaying a facial image of a first user in a preview image at the gaze position or displaying the facial image of the first user in the preview image at a target position on the screen; where the target position is within a first preset region range of the front-facing camera. The first preset region range is a region range close to the front-facing camera. Displaying the facial image of the first user within the first preset region range makes the gaze of a user more inclined to look towards the front-facing camera.

Figure 2:
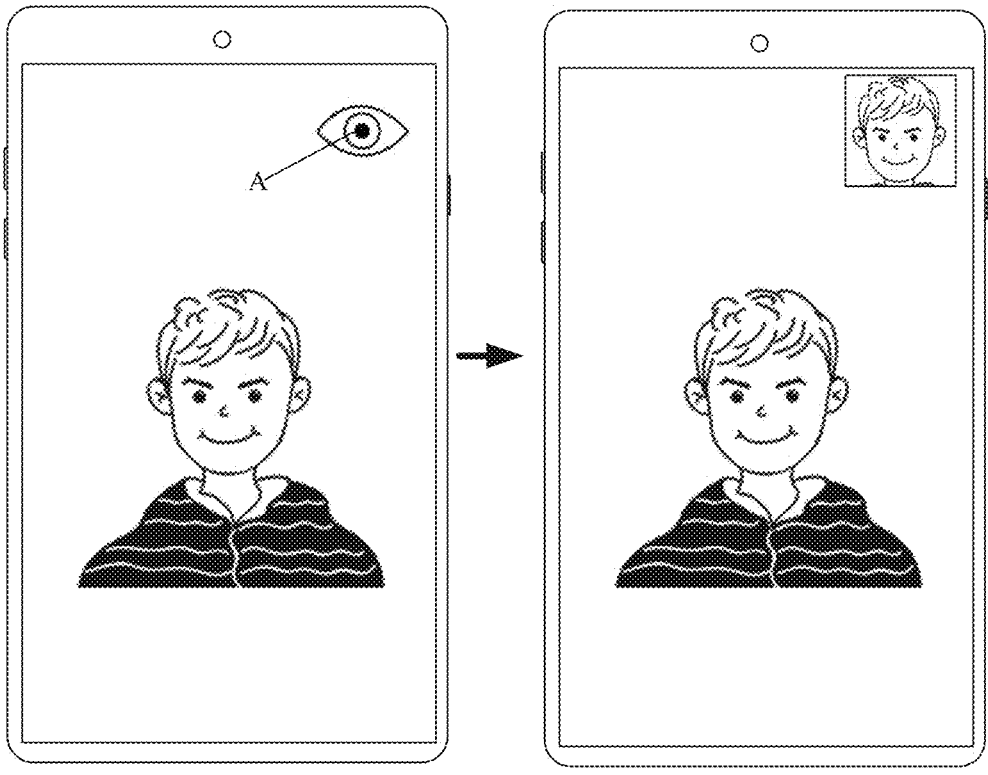
FIG. 2 is a first schematic diagram of an example according to an embodiment of this application.
Figure 3:
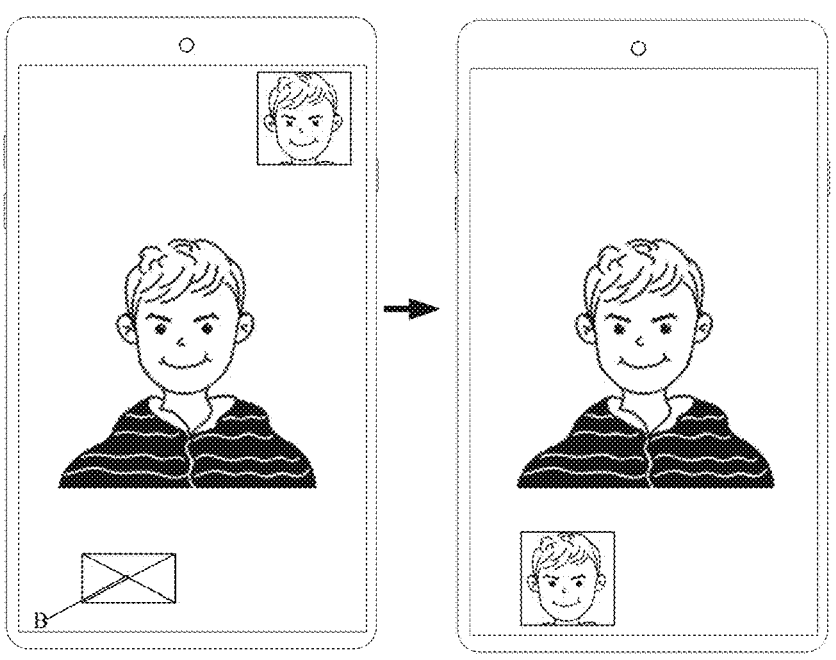
FIG. 3 is a second schematic diagram of an example according to an embodiment of this application.

When the user adjusts their eye expression to capture images with different eye expressions through the front-facing camera, causing the gaze of the user to not concentrate in a fixed region within a certain period (that is, the first preset duration), the facial image of the first user in the preview image can be extracted and displayed at the gaze position. This allows the facial image of the first user to move with the change of the gaze position, enabling the first user to view their facial state in real-time, thus solving the problem where the user, able to see the preview image but not their own facial image, finds it difficult to confirm their facial state. As shown in FIG. 2, if the current gaze position of the user is A, then the extracted facial image is displayed at position A. When the gaze position of a user changes from A to B, then the extracted facial image is displayed at position B, as shown in FIG. 3.

When the user wants to check their appearance and also look towards the front-facing camera, causing the gaze of the user not to be concentrated in a fixed region with a period of time (that is, the first preset duration), the facial image of the first user in the preview image can be extracted and displayed at a position close to the front-facing camera (that is, the target position) for the user to view. This helps prevent the user from moving their gaze too far away from the camera while attempting to check their appearance.

In the embodiments of this application, corresponding processing operations are executed based on the eyeball gaze position of a user when the front-facing camera of an electronic device is used to capture images, assisting the user in photographing and meeting a greater range of the photographing needs of users.

As an optional embodiment, when the preview image includes at least two facial images, the facial image of a first user can be at least one of the facial images in the preview image. The facial image of the first user can be selected by the user or automatically determined by the system. In a case that the facial image of the first user is automatically determined by the system, among all users corresponding to the facial images, the user whose distance from the front camera is greater than or equal to a preset value can be determined as the first user. For users whose distance is less than the preset value, since they are far from the front-facing camera, they can be considered as users who accidentally entered the camera's view.

As an optional embodiment, before the performing a preset processing operation when the gaze position is not concentrated in a fixed region within a first preset duration in step 102, the photographing method may further include:

obtaining a preset number of gaze position coordinates of the user's eyeballs on the screen within the first preset duration; and in a case that the number of second gaze position coordinates within a second preset region range of each first gaze position coordinate is less than a first preset value, determining that the gaze position is not concentrated in a fixed region within the first preset duration.

The first gaze position coordinate is one of the gaze position coordinates obtained within the first preset duration, and the second gaze position coordinates are gaze position coordinates obtained within the first preset duration, excluding the first gaze position coordinate.

In the embodiments of this application, when determining whether the gaze position is concentrated in a fixed region within the first preset duration, a preset number of gaze position coordinates of the user's eyeballs on the screen can be obtained within the first preset duration. Then, according to the order in which the gaze position coordinates are obtained, each gaze position coordinate obtained within the first preset duration can be determined as the first gaze position coordinate in turn, and it can be judged whether the number of the second gaze position coordinates included within the second preset region range of each first gaze position coordinate is greater than or equal to the first preset value. If there is such a first gaze position coordinate, that is, there is a first gaze position coordinate for which the number of the second gaze position coordinates included within the second preset region range is greater than or equal to the first preset value, it is considered that the gaze position is concentrated in a fixed region within the first preset duration. If there is no such gaze position coordinate, that is, the number of the second gaze position coordinates included within the second preset region range of all first gaze position coordinates is less than the first preset value, it is considered that no gaze position is concentrated in a fixed region within the first preset duration.

It should be noted that the above processing process can be performed periodically with the first preset duration as a cycle, that is, every first preset duration, it is determined whether the gaze position is concentrated in a fixed region within the first preset duration. The first preset value is greater than or equal to half of the preset number.

Optionally, the embodiments of this application provide a specific implementation method for determining whether the gaze position is concentrated in a fixed region within the first preset duration based on the number of the second gaze position coordinates included within the second preset region range of the first gaze position coordinate, as described below.

The situation where the number of the second gaze position coordinates included within the second preset region range of each first gaze position coordinate is less than the first preset value, determining that the gaze position is not concentrated in a fixed region within the first preset duration, may include:

obtaining a preset number of gaze position coordinates of the user's eyeballs on the screen within the first preset duration according to a preset sampling rate; determining, one by one, the number of the second gaze position coordinates in the first preset circle corresponding to each first gaze position coordinate; and in a case that the number of the second gaze position coordinates in all first preset circles is less than the first preset value, determining that the gaze position is not concentrated in a fixed region within the first preset duration.

The first preset circle is a circle with the target point on the circumference curve of a second preset circle as the center and a second preset value as the radius; and the second preset circle is a circle with the first gaze position coordinate as the center and the second preset value as the radius; and the circumference curve of each second preset circle is evenly distributed with the third preset value of target points.

The region range of all first preset circles corresponding to a first gaze position coordinate is the second preset region range.

For a better understanding of the above embodiments, the following is a further explanation with an example.

Based on the preview screen S, a Cartesian coordinate system is established, with the lower-left corner point of the preview screen S as the origin of the Cartesian coordinate system.

Assume that the first preset duration is 5 seconds and the preset sampling frequency is 60 Hz; that is, eye tracking is performed every 5 seconds at a sampling rate of 60 Hz. Assume that a set E0 is obtained every 5 seconds, E0 is a collection of gaze position coordinates of the user obtained within 5 seconds, which includes 300 coordinate points, that is, $E0=(e1, e2, \ldots, e300)$.

After obtaining E0, the following processing process can be performed one by one according to the order in which the coordinates are obtained:

Taking the gaze position coordinate e1 as an example, with e1 as the center and S/5 as the radius, a circle M (that is, the second preset circle) is established. 360 points v (that is, target points) are evenly taken on the circumference curve of circle M. Then, with point v as the center and S/5 as the radius, a circle m (that is, the first preset circle) is established, resulting in 360 circles m, with the center e1 of circle M located on circle m. After that, it is judged whether each circle m includes at least 150 gaze position coordinates from the set E0.

For the gaze position coordinates $e2, e3, \ldots, e300$, the above processing operation for e1 is performed until a circle m is detected that contains at least 150 gaze position coordinates from the set E0, then it is considered that the gaze region of a user is relatively concentrated, that is, the eyeball gaze position of a user is concentrated in a fixed region within a collection period of 5 seconds. If there is no such circle m, it is considered that the gaze region of a user is not concentrated enough, that is, the eyeball gaze position of a user is not concentrated in a fixed region within a collection period of 5 seconds.

It can be understood that if there is a circle m corresponding to e1 that contains at least 150 gaze position coordinates from the set E0, there is no need to repeat the above processing operation for the gaze position coordinates $e2, e3, \ldots, e300$.

Through the above method, the gaze position of a user can be determined more accurately whether it is concentrated. For some extreme cases, such as having at least the first preset number of the second gaze position coordinates on the circumference curve of the second preset circle, the above method can also accurately determine that the gaze position is relatively concentrated.

It should be noted that in the above example, the specific numerical values of the parameters are only for illustrative purposes, and the specific situation can be set according to actual needs.

As an optional embodiment, in a case that the preset processing operation includes displaying a facial image of a first user in a preview image at the gaze position, the displaying a facial image of a first user in a preview image at the gaze position may include:

displaying first prompt information in a case that the gaze position is not on the front-facing camera and is not concentrated in a fixed region within the first preset duration, receiving a first input from the user for a target button, and in response to the first input, displaying the facial image of the first user at the gaze position.

The first prompt information mentioned here is used to prompt the user whether to activate the target function, which includes the target button for activating the target function. The target function here is to display the facial image of the first user at the gaze position.

When the gaze of a user does not look at the front-facing camera and is not concentrated in a fixed region within a certain time, it indicates that the user may be adjusting their eye expression to capture images with different eye expressions. At this time, the user can be prompted whether to activate the function of displaying the facial image of the first user at the gaze position, that is, the function of moving the facial image of the first user with the gaze position of a user, allowing the user to choose whether to activate the target function according to their own needs.

As an optional embodiment, the preset processing operation may include displaying the facial image of the first user in the preview image at a target position on the screen.

The aforementioned "displaying the facial image of the first user at a target position on the screen" may include:

displaying the facial images of the first users at the target positions on the screen according to a relative positional relationship between the first users in a case that the number of the first users is at least two.

Figure 4:
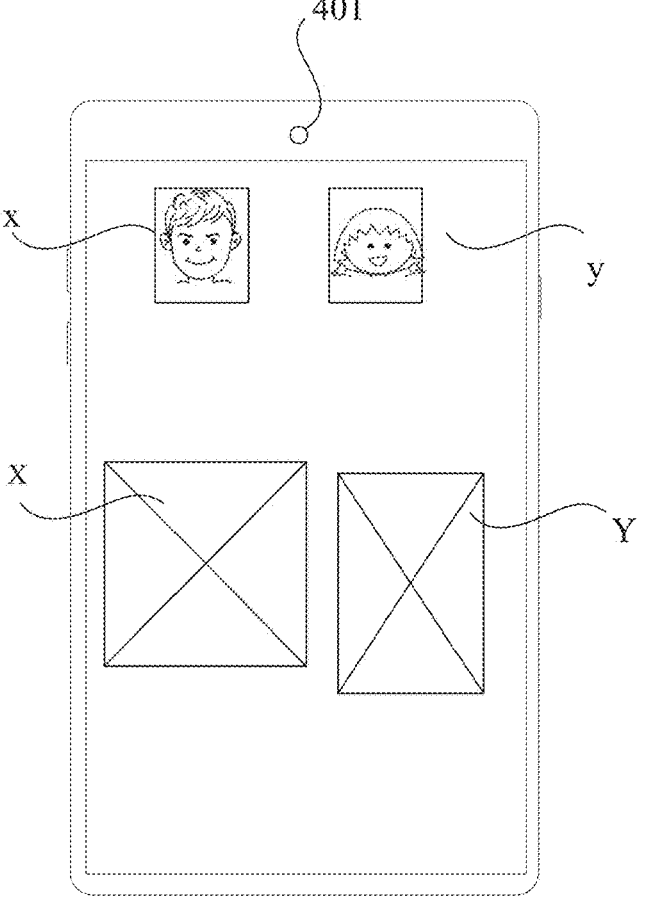
FIG. 4 is a third schematic diagram of an example according to an embodiment of this application.

In the embodiments of this application, in the scenario of multi-person photographing, the facial images of the subjects can be displayed at positions on the screen close to the camera according to the relative positions of the multiple subjects. For example, as shown in FIG. 4, the facial image x of the subject X positioned to the left can be placed at the position to the left under the camera 401 on the screen, and the facial image y of the subject Y positioned to the right can be placed at the position to the right under the camera 401, facilitating each subject to check their facial state and confirm their position.

As an optional embodiment, the aforementioned "displaying a facial image of a first user in a preview image at the gaze position or displaying the facial image of the first user at a target position on the screen" may include:

obtaining the facial image of the first user; obtaining a target distance between the first user and the front-facing camera; obtaining a target proportion corresponding to the target distance based on a preset corresponding relationship between the distance and the proportion; adjusting a size of the facial image of the first user based on the target proportion; and displaying the resized facial image of the first user at the gaze position or at the target position on the screen.

Here, the "distance" in "based on a preset corresponding relationship between the distance and the proportion" refers to a distance between the user and the front-facing camera, and the "proportion" in "based on a preset corresponding relationship between the distance and the proportion" refers to the proportion of the resized facial image to the preview image.

In the embodiments of this application, before the facial image of the first user is displayed, the facial image of the first user can be obtained from the preview image. The size of the facial image is negatively correlated with the distance between the user and the camera, that is, the closer the user is to the camera, the larger the facial image; the farther away the user from the camera, the smaller the facial image. When the facial image is large, if the facial image of the first user is displayed directly, it would cover most of the preview image, affecting the user's ability to view the preview image; when the facial image is small, if the facial image of the first user is displayed directly, it may be too small for the user to see the facial image clearly. Therefore, after obtaining the facial image of the first user, the embodiments of this application can further adjust the size of the facial image of the first user based on the distance between the first user and the front-facing camera, and then display the resized facial image of the first user at the gaze position or at the target position on the screen, allowing the facial image of the first user to be displayed at a suitable size without overly obscuring the preview image and facilitating the user to see the facial image clearly.

Optionally, in the embodiments of this application, the size of the facial image of the first user can further be adjusted based on the proportion of the facial image to the preview image. For example, a second proportion corresponding to the third proportion of the facial image of the first user to the preview image is determined based on a preset corresponding relationship between the first proportion and the second proportion, and then the size of the facial image of the first user is adjusted according to the second proportion corresponding to the third proportion. That is, the size of the facial image of the first user is adjusted with the goal of achieving the proportion of the resized facial image of the first user to the preview image as the second proportion corresponding to the third proportion.

Here, the first proportion refers to the proportion of the facial image to the preview image before adjustment, and the second proportion refers to the proportion of the facial image to the preview image after adjustment.

For example, the first proportion is represented by p, and the second proportion is represented by q. The preset corresponding relationship between the first proportion and the second proportion can be: when $p>20\%$, then $q=10\%$; when $20\%>p>15\%$, then $q=15\%$; and when $p<15\%$, then $q=20\%$.

Optionally, when the facial image of the first user is displayed at the gaze position, the center point of the facial image of the first user can be made to coincide with the gaze position coordinates.

Optionally, the step of obtaining the facial image of the first user may include:

obtaining the long side of a first rectangular frame; obtaining a second rectangular frame centered on the center point of the first rectangular frame with a length of the long side of the first rectangular frame as the side length; and determining a facial image within the second rectangular frame as the facial image of the first user.

Here, the first rectangular frame is used to identify the facial image and its long side is greater than its width. The second rectangular frame is a square.

In the embodiments of this application, in order to obtain a relatively complete facial image, when the length of the rectangular frame used to identify the facial image (that is, the first rectangular frame) is greater than its width, a square frame (that is, the second rectangular frame) can be established centered on the center point of the rectangular frame with the length of the rectangular frame as the side length, and then the facial image framed by the square frame is obtained as the facial image of the first user. Since the area of the square frame is larger than that of the rectangular frame, the facial image obtained based on the first rectangular frame is relatively more complete compared to the facial image obtained based on the second rectangular frame.

It can be understood that, in addition to the above method of obtaining the facial image, a third rectangular frame with a ratio greater than 1 to the first rectangular frame can also be established centered on the center point of the first rectangular frame, and then the facial image within the third rectangular frame is determined as the facial image of the first user. Since the area of the third rectangular frame is larger than that of the first rectangular frame, the facial image obtained based on the third rectangular frame can also be relatively more complete compared to the facial image obtained based on the first rectangular frame.

As an optional embodiment, when the gaze position is not at the front-facing camera within the first preset duration, second prompt information for prompting the user to look at the front-facing camera can be displayed on the screen.

When the user's eyes do not look at the front-facing camera within a certain period (that is, the first preset duration), second prompt information can be displayed on the screen, reminding the user to look at the front-facing camera to avoid the eyes looking downward or tilting in the captured image.

Optionally, the aforementioned "displaying second prompt information on the screen to prompt the user to look at the front-facing camera" may include: displaying a prompt mark at the target position on the screen.

Here, the prompt mark is used to prompt the user to look at the position where the prompt mark is located.

Since the prompt mark is displayed at a position on the screen close to the front-facing camera, when the user looks at the prompt mark, the line of sight is also closer to the front-facing camera, which can reduce the problem of the eyes looking downward or tilting due to not looking at the camera.

Figure 5:
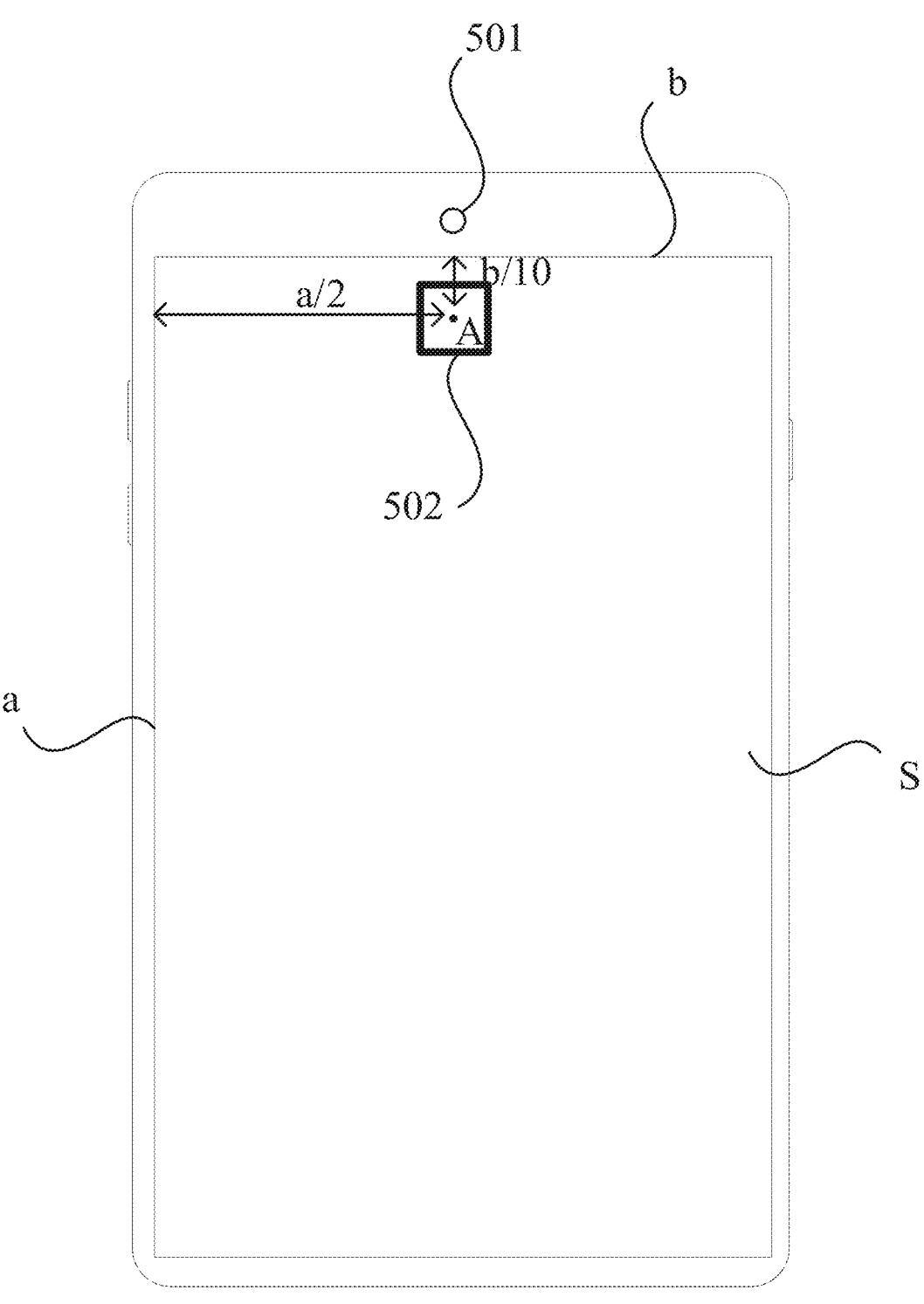
FIG. 5 is a fourth schematic diagram of an example according to an embodiment of this application.

For example, as shown in FIG. 5, assuming that the front-facing camera 501 is located in the middle position at the top of the mobile phone screen, with the long side of the preview screen S as a and the short side as b, the center point A of the prompt mark 502 can be: a point that is b/10 away from the upper short side of the preview screen S and a/2 away from the left long side of the preview screen S. Here, the user is set relative to the screen, and the aforementioned "upper" and "left" are relative to the user.

Optionally, after displaying the aforementioned prompt mark, the photographing method may further include: outputting third prompt information for prompting the user to take a photo when it is detected that the eyeball gaze position of a user is at the position where the prompt mark is located.

Here, the aforementioned third prompt information may include but is not limited to at least one of the following: voice prompt information, image prompt information, and light prompt information.

In the embodiments of this application, after displaying the prompt mark, if it is detected that the eyeball gaze position coordinates of a user are within the region of the position where the prompt mark is located, it indicates that the user's eyeballs tend to look at the front-facing camera and the eye state is good, then the user can be prompted that they can take a photo, thus obtaining a captured image with a direct gaze. Certainly, it is also possible to automatically take a photo when it is detected that the eyeball gaze position coordinates of a user are within the region of the position where the prompt mark is located.

Here, in a case that the preview image includes at least two facial images, it is possible to prompt the user to take a photo or directly take a photo when it is detected that the eyeball gaze position coordinates of all users corresponding to the facial images are within the region of the position where the prompt mark is located.

Finally, it should be noted that the photographing mentioned in the embodiments of this application may include but is not limited to: taking photos, shooting videos, and the like.

In summary, in the embodiments of this application, corresponding processing operations are executed based on the eyeball gaze position of a user when the front-facing camera of an electronic device is used to capture images, assisting the user in photographing and meeting a greater range of the photographing needs of users.

It should be noted that the photographing method provided by the embodiments of this application can be executed by a photographing apparatus or a control module within the photographing apparatus for executing the photographing method. The embodiments of this application are described with the photographing apparatus executing the photographing method as an example.

Figure 6:
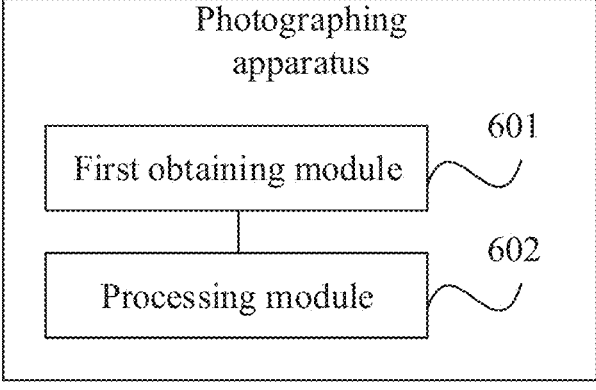
FIG. 6 is a schematic block diagram of a photographing apparatus according to an embodiment of this application.

FIG. 6 is a schematic block diagram of a photographing apparatus according to an embodiment of this application. The photographing apparatus is applicable to electronic devices with photographing apparatus functions such as mobile phones, tablet computers, cameras, and the like.

As shown in FIG. 6, the photographing apparatus may include:

a first obtaining module 601, configured to obtain an eyeball gaze position of a user when a front-facing camera is activated to shoot an image; and a processing module 602, configured to perform a preset processing operation when the gaze position is not concentrated in a fixed region within a first preset duration.

The preset processing operation includes: displaying a facial image of a first user in a preview image at the gaze position or displaying the facial image of the first user in the preview image at a target position on the screen; where the target position is within a first preset region range of the front-facing camera.

Optionally, the apparatus may further include:

a second obtaining module, configured to obtain a preset number of gaze position coordinates of the user's eyeballs on the screen within the first preset duration; and a determining module, configured to determine that the gaze position is not concentrated in a fixed region within the first preset duration in a case that the number of second gaze position coordinates included within a second preset region range of each first gaze position coordinate is less than a first preset value.

The first gaze position coordinate is one of the gaze position coordinates obtained within the first preset duration, and the second gaze position coordinates are gaze position coordinates obtained within the first preset duration, excluding the first gaze position coordinate.

Optionally, the processing module 602 may include:

a first display unit, configured to display the facial images of the first users at positions close to the front-facing camera on the screen according to a relative positional relationship between the first users in the preview image in a case that the number of the facial images of the first users is at least two.

Optionally, the processing module 602 may include:

a first obtaining unit, configured to obtain the facial image of the first user;

a second obtaining unit, configured to obtain a target distance between the first user and the front-facing camera;

a third obtaining unit, configured to obtain the target proportion corresponding to the target distance based on a preset corresponding relationship between the distance and the proportion, where the distance is a distance between the user and the front-facing camera, and the proportion is a proportion of the resized facial image to the preview image;

an adjustment unit, configured to adjust a size of the facial image of the first user based on the target proportion; and a second display unit, configured to display the resized facial image of the first user at the gaze position or at the target position on the screen.

In the embodiments of this application, when the front-facing camera of an electronic device is used to capture images, corresponding processing operations are executed based on the eyeball gaze position of a user, assisting the user in photographing apparatus and satisfying a greater range of user's photographing needs.

The photographing apparatus in this embodiment of this application may be an apparatus or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The photographing apparatus in this embodiment of this application may be an apparatus having an operating system. The operating system may be an android operating system, an iOS operating system, or another possible operating system. This is not specifically limited in the embodiments of this application.

The photographing apparatus provided in this embodiment of this application can implement the processes implemented in the photographing method embodiment in FIG. 1. To avoid repetition, details are not described herein again.

Figure 7:
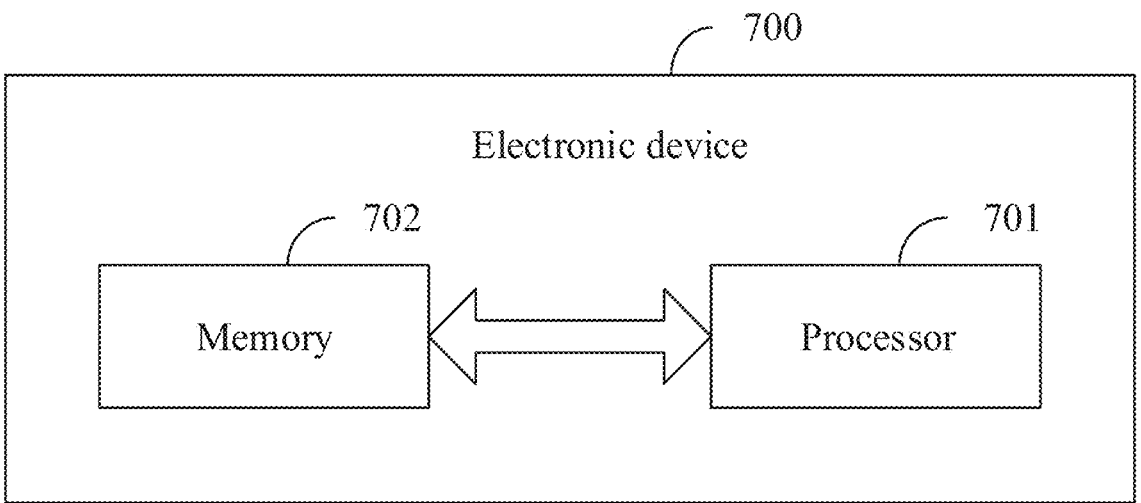
FIG. 7 is a first schematic block diagram of an electronic device according to an embodiment of this application.

Optionally, as shown in FIG. 7, an embodiment of this application further provides an electronic device 700, including a processor 701, a memory 702, and a program or an instruction stored in the memory 702 and capable of running on the processor 701, where when the program or instruction is executed by the processor 701, the processes of the foregoing photographing method embodiment are implemented, with the same technical effects achieved. To avoid repetition, details are not further described herein.

It should be noted that the electronic device 700 in an embodiment of this application includes the foregoing mobile electronic device and non-mobile electronic device.

Figure 8:
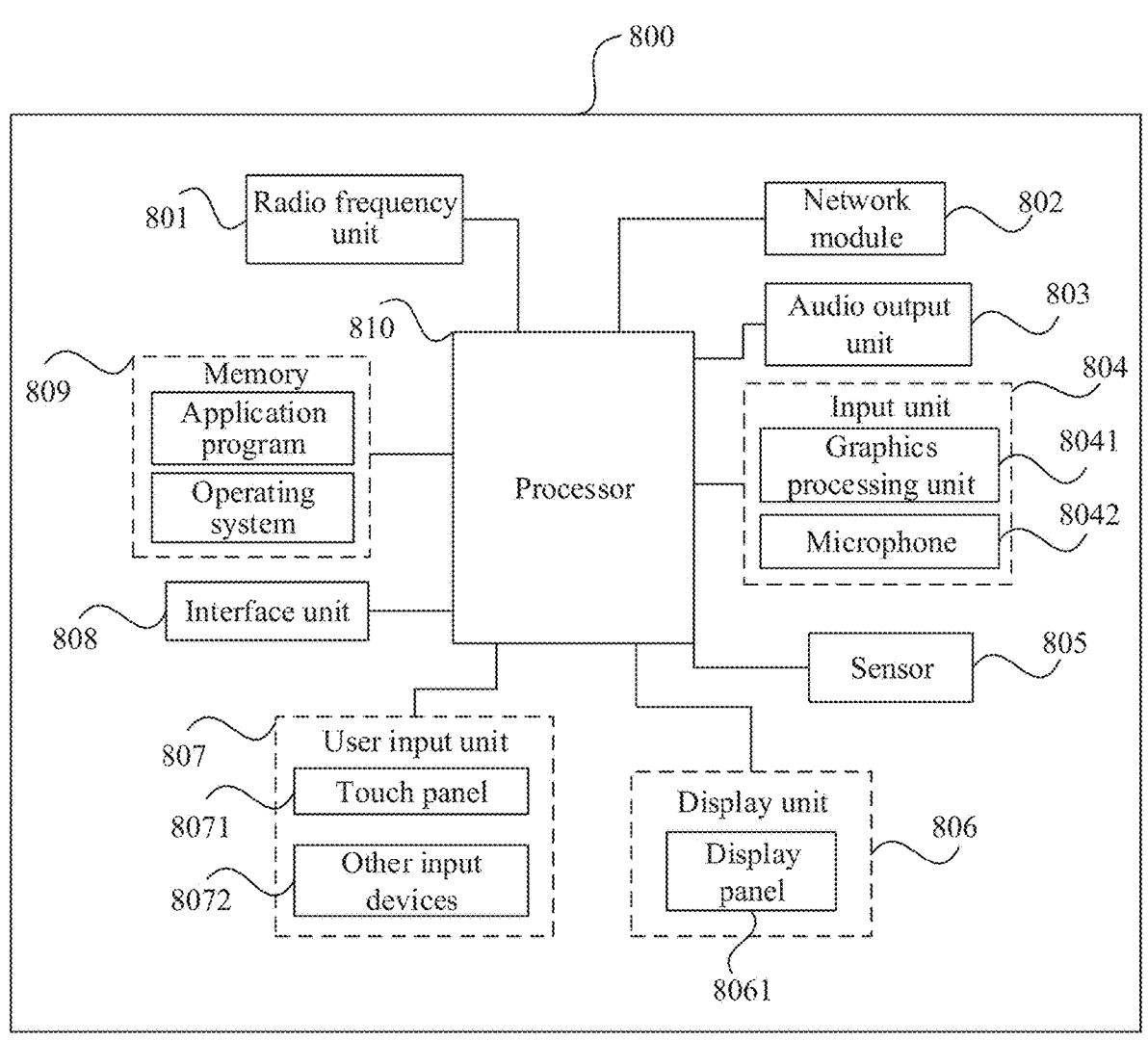
FIG. 8 is a second schematic block diagram of an electronic device according to an embodiment of this application.

FIG. 8 is a schematic diagram of a hardware structure of an electronic device according to an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

It can be understood by those skilled in the art that the electronic device 800 may further include a power supply (for example, a battery) supplying power to the components. The power supply may be logically connected to the processor 810 via a power management system, so that functions such as charge management, discharge management, and power consumption management are implemented via the power management system. The structure of the electronic device shown in FIG. 8 does not constitute a limitation on the electronic device. The electronic device may include more or fewer components than shown in the drawing, combine some of the components, or arrange the components differently. Details are not described herein.

The processor 810 can be configured to: obtain an eyeball gaze position of a user when a front-facing camera is activated to shoot an image; and perform a preset processing operation when the gaze position is not concentrated in a fixed region within a first preset duration.

The preset processing operation includes displaying a facial image of a first user in a preview image at the gaze position or displaying the facial image of the first user in the preview image at a target position on the screen; where the target position is within a first preset region range of the front-facing camera.

Optionally, the preset processing operation includes: displaying the facial image of the first user at the gaze position in the preview image in a case that the gaze position is not concentrated in a fixed region within the first preset duration.

The processor 810 can be further configured to: obtain a preset number of gaze position coordinates of the user's eyeballs on the screen within the first preset duration; and determine that the gaze position is not concentrated in a fixed region within the first preset duration in a case that the number of second gaze position coordinates within a second preset region range of each first gaze position coordinate is less than a first preset value.

The first gaze position coordinate is one of the gaze position coordinates obtained within the first preset duration, and the second gaze position coordinates are gaze position coordinates obtained within the first preset duration, excluding the first gaze position coordinate.

Optionally, the processor 810 can be further configured to display the facial images of the first users at the target positions on the screen according to a relative positional relationship between the first users in the preview image in a case that the number of the facial images of the first users is at least two.

Optionally, the processor 810 can be further configured to: obtain the facial image of the first user; obtain a target distance between the first user and the front-facing camera; obtain a target proportion corresponding to the target distance based on a preset corresponding relationship between the distance and the proportion; where the distance is a distance between the user and the front-facing camera, and the proportion is a proportion of the resized facial image to the preview image; adjust a size of the facial image of the first user based on the target proportion; and display the resized facial image of the first user at the gaze position or at the target position on the screen.

In the embodiments of this application, when the front-facing camera of an electronic device is used to capture images, corresponding processing operations are executed based on the eyeball gaze position of a user, assisting the user in photographing needs and satisfying a greater range of user's photographing needs.

It should be understood that in this embodiment of this application, the input unit 804 may include a graphics processing unit (GPU) 8041 and a microphone 8042. The graphics processing unit 8041 processes image data of a static picture or a video that is obtained by an image capture apparatus (for example, a camera) in a video capture mode or an image capture mode. The display unit 806 may include a display panel 8061. The display panel 8061 may be configured in a form of a liquid crystal display, an organic light-emitting diode display, or the like. The user input unit 807 includes a touch panel 8071 and other input devices 8072. The touch panel 8071 is also referred to as a touch-screen. The touch panel 8071 may include two parts: a touch detection apparatus and a touch controller. The other input devices 8072 may include but are not limited to a physical keyboard, a function button (such as a volume control button or a power button), a trackball, a mouse, and a joystick. Details are not described herein. The memory 809 may be configured to store software programs and various data which include but are not limited to application programs and operating systems. The processor 810 may integrate an application processor and a modem processor. The application processor mainly processes the operating system, a user interface, an application program, and the like. The modem processor mainly processes wireless communication. It can be understood that the modem processor may alternatively be not integrated in the processor 810.

An embodiment of this application further provides a non-transitory readable storage medium, where the non-transitory readable storage medium stores a program or an instruction, and when the program or instruction is executed by a processor, the processes of the foregoing photographing method embodiments are implemented, with the same technical effects achieved. To avoid repetition, details are not described herein again.

The processor is the processor in the electronic device in the foregoing embodiments. The non-transitory readable storage medium includes a non-transitory computer-readable storage medium such as a computer read-only memory (ROM), a random access memory (RAM), a magnetic disk, or an optical disc.

Another embodiment of this application provides a chip, where the chip includes a processor and a communications interface, the communications interface is coupled to the processor, and the processor is configured to run a program or an instruction to implement the processes of the foregoing photographing method embodiments, with the same technical effects achieved. To avoid repetition, details are not described herein again.

It should be understood that the chip in the embodiments of this application may also be referred to as a system-level chip, a system chip, a chip system, a system on chip, or the like.

It should be noted that in this specification, the terms "comprise" and "include", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Based on such an understanding, the technical solutions of this application essentially, or the part contributing to the prior art may be implemented in a form of a computer software product. The computer software product is stored in a storage medium (for example, a ROM, RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other forms without departing from the principle of this application and the protection scope of the claims, and all such forms fall within the protection scope of this application.

What is claimed is:

1. A photographing method, wherein the method comprises:

obtaining an eyeball gaze position of a user when a front-facing camera is activated to shoot an image; and performing a preset processing operation when the gaze position is not concentrated in a fixed region within a first preset duration; wherein the preset processing operation comprises displaying a facial image of a first user in a preview image at the gaze position or displaying the facial image of the first user in the preview image at a target position on the screen; wherein the target position is within a first preset region range of the front-facing camera;

wherein before the performing a preset processing operation when the gaze position is not concentrated in a fixed region within a first preset duration, the method further comprises:

obtaining a preset number of gaze position coordinates of the user's eyeballs on the screen within the first preset duration; and in a case that the number of second gaze position coordinates within a second preset region range of each first gaze position coordinate is less than a first preset value, determining that the gaze position is not concentrated in a fixed region within the first preset duration; wherein the first gaze position coordinate is one of the gaze position coordinates obtained within the first preset duration, and the second gaze position coordinates are gaze position coordinates obtained within the first preset duration, excluding the first gaze position coordinate.

2. The photographing method according to claim 1, wherein the displaying the facial image of the first user at a target position on the screen comprises:

displaying the facial images of the first users at the target positions on the screen according to a relative positional relationship between the first users in a case that the number of the first users is at least two.

3. The photographing method according to claim 1, wherein the displaying a facial image of a first user in a preview image at the gaze position or displaying the facial image of the first user in the preview image at a target position on the screen comprises:

obtaining the facial image of the first user;

obtaining a target distance between the first user and the front-facing camera;

obtaining a target proportion corresponding to the target distance based on a preset corresponding relationship between the distance and the proportion; wherein the distance is a distance between the user and the front-facing camera, and the proportion is a proportion of the resized facial image to the preview image;

adjusting a size of the facial image of the first user based on the target proportion; and displaying the resized facial image of the first user at the gaze position or at the target position on the screen.

4. A chip, wherein the chip comprises a processor of an electronic device and a communications interface, wherein the communications interface is coupled to the processor, and the processor is configured to run a program or an instruction to perform the steps of the photographing method according to claim 1.

5. The chip according to claim 4, wherein when displaying the facial image of the first user at a target position on the screen, the program or instruction, when executed by the processor of the electronic device, causes the electronic device to perform:

displaying the facial images of the first users at the target positions on the screen according to a relative positional relationship between the first users in a case that the number of the first users is at least two.

6. The chip according to claim 4, wherein when displaying a facial image of a first user in a preview image at the gaze position or displaying the facial image of the first user in the preview image at a target position on the screen, the program or instruction, when executed by the processor of the electronic device, causes the electronic device to perform:

obtaining the facial image of the first user;

obtaining a target distance between the first user and the front-facing camera;

obtaining a target proportion corresponding to the target distance based on a preset corresponding relationship between the distance and the proportion; wherein the distance is a distance between the user and the front-facing camera, and the proportion is a proportion of the resized facial image to the preview image;

adjusting a size of the facial image of the first user based on the target proportion; and displaying the resized facial image of the first user at the gaze position or at the target position on the screen.

7. A computer program product, wherein the program product is stored on a non-volatile storage medium, wherein the program product is executed by at least one processor of an electronic device to perform the steps of the photographing method according to claim 1.

8. The computer program product according to claim 7, wherein when displaying the facial image of the first user at a target position on the screen, the program or instruction, when executed by the processor of the electronic device, causes the electronic device to perform:

displaying the facial images of the first users at the target positions on the screen according to a relative positional relationship between the first users in a case that the number of the first users is at least two.

9. The computer program product according to claim 7, wherein when displaying a facial image of a first user in a preview image at the gaze position or displaying the facial image of the first user in the preview image at a target position on the screen, the program or instruction, when executed by the processor of the electronic device, causes the electronic device to perform:

obtaining the facial image of the first user;

obtaining a target distance between the first user and the front-facing camera;

obtaining a target proportion corresponding to the target distance based on a preset corresponding relationship between the distance and the proportion; wherein the distance is a distance between the user and the front-facing camera, and the proportion is a proportion of the resized facial image to the preview image;

adjusting a size of the facial image of the first user based on the target proportion; and displaying the resized facial image of the first user at the gaze position or at the target position on the screen.

10. An electronic device comprising a processor, a memory, and a program or an instruction stored on the memory and capable of running on the processor, wherein the program or instruction, when executed by the processor, causes the electronic device to perform:

obtaining an eyeball gaze position of a user when a front-facing camera is activated to shoot an image; and performing a preset processing operation when the gaze position is not concentrated in a fixed region within a first preset duration; wherein the preset processing operation comprises displaying a facial image of a first user in a preview image at the gaze position or displaying the facial image of the first user in the preview image at a target position on the screen; wherein the target position is within a first preset region range of the front-facing camera;

wherein before performing a preset processing operation when the gaze position is not concentrated in a fixed region within a first preset duration, the program or instruction, when executed by the processor, causes the electronic device to further perform:

obtaining a preset number of gaze position coordinates of the user's eyeballs on the screen within the first preset duration; and in a case that the number of second gaze position coordinates within a second preset region range of each first gaze position coordinate is less than a first preset value, determining that the gaze position is not concentrated in a fixed region within the first preset duration;

wherein the first gaze position coordinate is one of the gaze position coordinates obtained within the first preset duration, and the second gaze position coordinates are gaze position coordinates obtained within the first preset duration, excluding the first gaze position coordinate.

11. The electronic device according to claim 10, wherein when displaying the facial image of the first user at a target position on the screen, the program or instruction, when executed by the processor, causes the electronic device to perform:

displaying the facial images of the first users at the target positions on the screen according to a relative positional relationship between the first users in a case that the number of the first users is at least two.

12. The electronic device according to claim 10, wherein when displaying a facial image of a first user in a preview image at the gaze position or displaying the facial image of the first user in the preview image at a target position on the screen, the program or instruction, when executed by the processor, causes the electronic device to perform:

obtaining the facial image of the first user;

obtaining a target distance between the first user and the front-facing camera;

obtaining a target proportion corresponding to the target distance based on a preset corresponding relationship between the distance and the proportion; wherein the distance is a distance between the user and the front-facing camera, and the proportion is a proportion of the resized facial image to the preview image;

adjusting a size of the facial image of the first user based on the target proportion; and displaying the resized facial image of the first user at the gaze position or at the target position on the screen.

13. A non-transitory readable storage medium, wherein the non-transitory readable storage medium stores a program or an instruction, wherein the program or instruction, when executed by a processor of an electronic device, causes the electronic device to perform:

obtaining an eyeball gaze position of a user when a front-facing camera is activated to shoot an image; and performing a preset processing operation when the gaze position is not concentrated in a fixed region within a first preset duration; wherein the preset processing operation comprises displaying a facial image of a first user in a preview image at the gaze position or displaying the facial image of the first user in the preview image at a target position on the screen; wherein the target position is within a first preset region range of the front-facing camera;

wherein before performing a preset processing operation when the gaze position is not concentrated in a fixed region within a first preset duration, the program or instruction, when executed by the processor of the electronic device, causes the electronic device to further perform:

obtaining a preset number of gaze position coordinates of the user's eyeballs on the screen within the first preset duration; and in a case that the number of second gaze position coordinates within a second preset region range of each first gaze position coordinate is less than a first preset value, determining that the gaze position is not concentrated in a fixed region within the first preset duration; wherein the first gaze position coordinate is one of the gaze position coordinates obtained within the first preset duration, and the second gaze position coordinates are gaze position coordinates obtained within the first preset duration, excluding the first gaze position coordinate.

14. The non-transitory readable storage medium according to claim 13, wherein when displaying the facial image of the first user at a target position on the screen, the program or instruction, when executed by the processor of the electronic device, causes the electronic device to perform:

displaying the facial images of the first users at the target positions on the screen according to a relative positional relationship between the first users in a case that the number of the first users is at least two.

15. The non-transitory readable storage medium according to claim 13, wherein when displaying a facial image of a first user in a preview image at the gaze position or displaying the facial image of the first user in the preview image at a target position on the screen, the program or instruction, when executed by the processor of the electronic device, causes the electronic device to perform:

obtaining the facial image of the first user;

obtaining a target distance between the first user and the front-facing camera;

obtaining a target proportion corresponding to the target distance based on a preset corresponding relationship between the distance and the proportion; wherein the distance is a distance between the user and the front-facing camera, and the proportion is a proportion of the resized facial image to the preview image;

adjusting a size of the facial image of the first user based on the target proportion; and displaying the resized facial image of the first user at the gaze position or at the target position on the screen.

* * * * *